United States Patent [19]
Jones et al.

[11] 3,874,637
[45] Apr. 1, 1975

[54] CANTED GASKET VALVE CONSTRUCTION

[75] Inventors: Lloyd K. Jones; David A. Yanov, both of Morgantown, W. Va.

[73] Assignee: Elk Manufacturing Company, Inc., Morgantown, W. Va.

[22] Filed: Oct. 31, 1973

[21] Appl. No.: 411,246

[52] U.S. Cl. ................ 251/345, 251/339, 251/340
[51] Int. Cl. ............................................ F16k 31/44
[58] Field of Search ........................... 251/343–345, 251/339, 340, 309, 310; 137/625.17

[56] References Cited
UNITED STATES PATENTS

| | | | |
|---|---|---|---|
| 1,160,342 | 11/1915 | Taft | 251/310 X |
| 2,631,002 | 3/1953 | Mueller | 251/310 |
| 3,005,468 | 10/1961 | Erwin et al. | 251/345 X |
| 3,111,980 | 11/1963 | Spies, Jr. | 251/340 |
| 3,135,293 | 6/1964 | Hulsey | 251/345 X |
| 3,166,097 | 1/1965 | Hinderer et al. | 251/310 X |
| 3,434,694 | 3/1969 | Skinner | 251/215 |
| 3,788,603 | 1/1974 | Snider | 251/345 |

*Primary Examiner*—Charles J. Myhre
*Assistant Examiner*—Ira S. Lazarus
*Attorney, Agent, or Firm*—Parmelee, Miller, Welsh & Kratz

[57] ABSTRACT

An improved valve construction employs a rotatable operating cylinder or sleeve that cooperates with a fixed stem or core within a housing to provide a controlled through-flow of fluid. A combination of transverse and diagonal O-ring gaskets form an incremental flow chamber in which a diagonal gasket serves to seal-off the joint between the stem and the operating sleeve across cooperating valve ports therebetween, and a transverse gasket serves to seal-off a joint between the rotatable operating sleeve and the housing. The valve when open also provides a flow path that has one or more right-angular or 90° changes of direction during its movement therethrough. The valving action is accomplished adjacent to or immediately after the change of flow direction has been accomplished.

14 Claims, 5 Drawing Figures

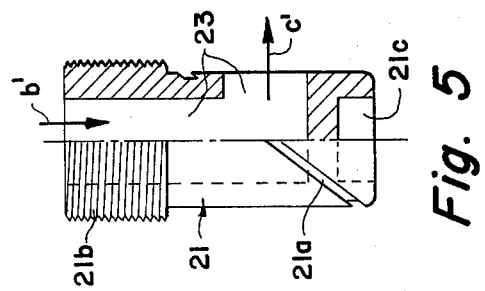
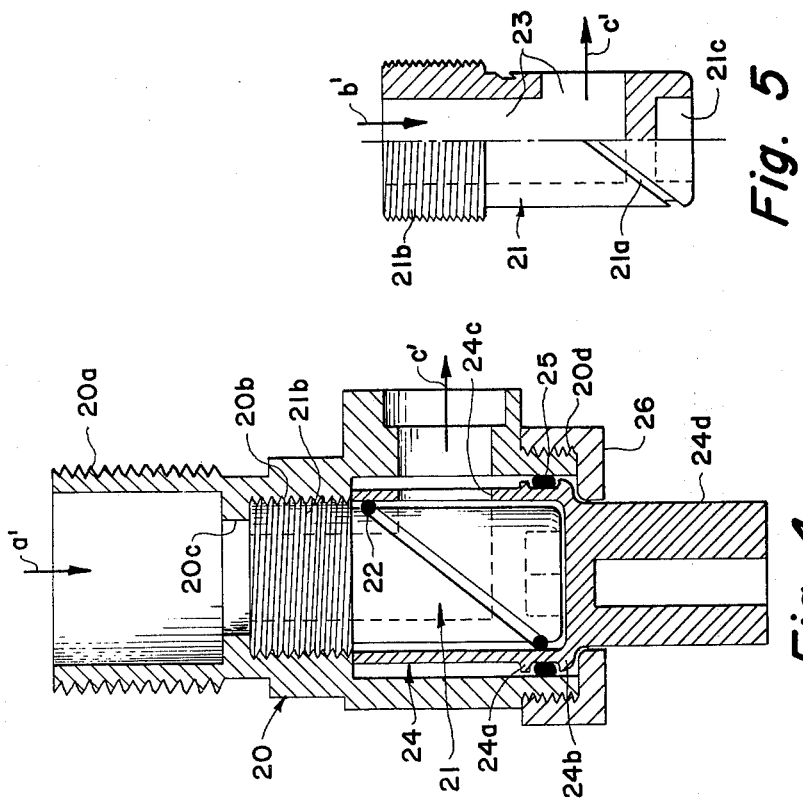
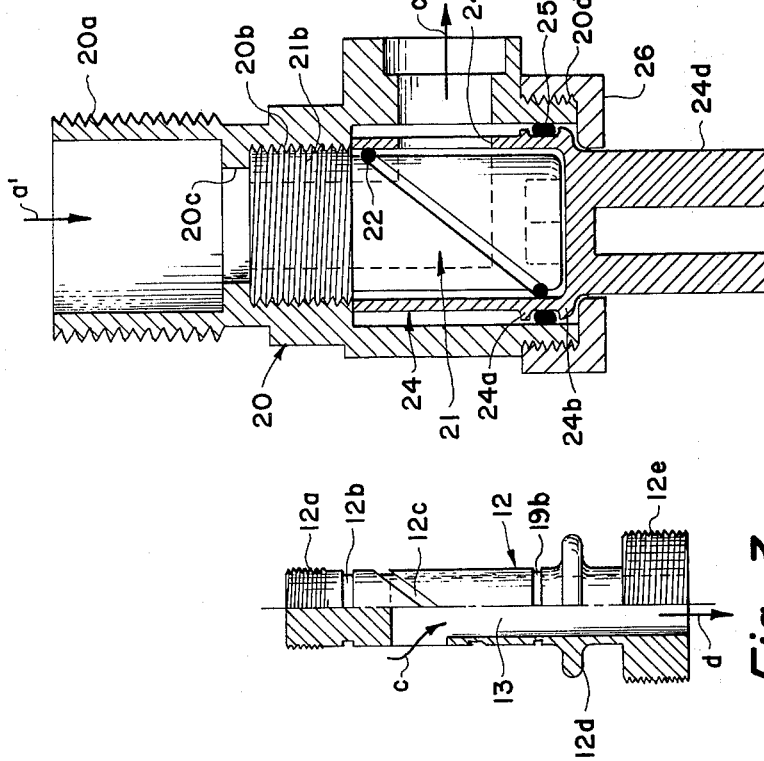
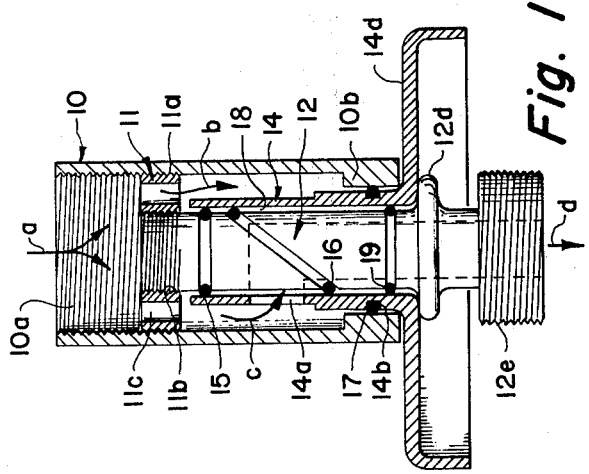
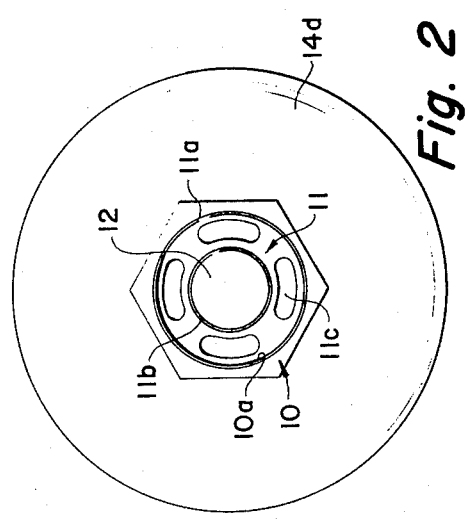

3,874,637

CANTED GASKET VALVE CONSTRUCTION

BACKGROUND OF THE INVENTION

Field of the Invention

This invention pertains to an improved, relatively inexpensive and simple, manually controlled, off and on fluid control valve of a so-called in line type and particularly, to a manually operated valve having an improved flow-through and operating construction and sealing gasket arrangement.

DESCRIPTION OF THE PRIOR ART

Various forms of valve arrangements have been used for fluid control, with the usual globe type valve and faucet employing a so-called compression-seal washer system, wherein a resilient gasket is squeezed-compressed by a forward movement of the head of a threaded stem against a ring-like seating area in the valve body. The efficiency of such a type of valve tends to vary greatly with the condition of the gasket and there is considerable wear and tear on the gasket by reason of the fact that a full sealing-off requires a tightened-down squeeze against the ring-like seating area, thus tending to cut into the gasket. The constant expansion, compression and rotational torque imposed on the gasket necessitates frequent replacement. The operation is such that increased manual force is required as the closing operation progresses, and a high initial force is required in starting to open the valve.

There has thus been the need for improved valve construction from the standpoint of both minimizing wear and tear on the sealing gasket means, as well as for improving the operation and minimizing the force required in effecting opening and closing movements.

SUMMARY OF THE INVENTION

It has thus been an object of the invention to fully evaluate the problem and find a practical solution in the form of a more acceptable and, at the same time, relatively inexpensive valve construction that is suitable for control of fluid flow.

Another object has been to develop an in-line valve, which, in addition to having an improved gasketing means or arrangement, employs three essential parts that are assembled in such a manner as to facilitate maintenance and repair and to improve fluid flow by reducing friction due to major and extended changes of direction.

Another object of the invention has been to devise a relatively simple valve that eliminates the adverse features of a conventional compression type, as employed primarily for closing-off and opening fluid flow from a source, container or tank.

A further object of the invention has been to employ a through-flow arrangement and sealing gasket assembly and operation such that substantially uniform and minimal force will be required in moving the valve mechanism in a shearing action to the fluid flow between fully open and fully closed positions.

These and other objects of the invention will appear to those skilled in the art from the illustrated embodiments and the claims.

BRIEF DESCRIPTION OF THE DRAWINGS

In the drawings, FIG. 1 is a side sectional view in elevation illustrating an embodiment of the invention with the parts thereof in a fully open, through-flow positioning, as indicated by representative arrows.

FIG. 2 is a top plan view on the scale of and of the valve construction shown in FIG. 1.

FIG. 3 is a side sectional view in elevation and partial section showing details of the construction of an inner core or stem part of the valve of and on the same scale as FIGS. 1 and 2.

FIG. 4 is a side sectional view in elevation on the same scale as FIGS. 1 to 3, illustrating another embodiment of the invention.

And, FIG. 5 is a side sectional view in elevation on the scale of FIG. 4 showing details of the construction of the stem part of the second embodiment.

DESCRIPTION OF THE PREFERRED EMBODIMENT

With reference particularly to the embodiment of FIGS. 1, 2 and 3, the invention utilizes a hollow casing or housing 10 which extends longitudinally or axially and is shown having a hexagonal outer shape. An upper, fluid inlet or first open end portion 10a is shown provided with an internal or female threading therealong for connecting the valve to the bottom of a tank or container or to other source of fluid. An insertable weir part 11 has external threads 11a that cooperate with internal or female threading within the inlet portion 10a to removably secure it within the housing 10. The weir part 11 has a female left-hand threaded central bore 11b which, in turn, receives an upper, closed-off end of a fixed-position stem or core part 12 and removably but securely retains it in position within the housing 10. The weir 11 (see FIGS. 1 and 2) has a group of ports, slots or aperatures 11c therethrough for passing fluid from the inlet portion 10a into the upper end of the major chamber of the housing 10.

Referring particularly to FIG. 1, the housing 10 defines a major flow chamber centrally axially therealong and is open at its opposite, second or lower end. The housing 10 terminates at its opposite, second or lower end in a thickened outlet wall portion 10b which not only serves to rotatably position an operating control sleeve or cylinder part 14, but to also provide for sealing the major chamber off along the operating joint between the two parts. The fixed position stem part 12 is removably mounted to extend from the inlet portion 10a of the housing longitudinally out through its opposite, second or lower open end portion 10b.

The series of ports or slots 11c lie in the weir 11 to enable fluid entering the inlet 10a (see the arrow a) to pass through therethrough (as shown by the arrow b) into the major chamber of the housing 10. If a side port 14a portion in the operating sleeve part 14 is aligned (open) with the flow chamber (the incremental area or volume formed by the stem part 12, the sleeve part 14, and transverse O-ring 15 and oblique O-ring 16), then fluid will, after changing its direction 90°, pass through the port 14a into the bore 13 (see arrow c) and out through a suitable connection (see arrow d).

The operating sleeve part 14 may be manually controlled by rotating it freely within the housing 10, to thus rotate its side port portion 14a into and out of registry with the flow chamber through a side port at a transverse end of the bore 13 by manually turning a radially outwardly extending or transversely enlarged hand wheel part 14d that is located outside of the lower, opposite or second end portion 10b of the housing 10. A ring-like rim or flange 12d carried by the stem part 12 is adapted to abut the axial or hub portion of hand or turn wheel 14d to retain the sleeve control part 14 in an operating position within the housing 10. The extreme lower or outlet end of the stem part 12, is shown with an enlarged threaded connector portion 12e, and may be provided with other suitable connection means.

The spacing between the fixed-position stem 12 and the operating sleeve or control part 14 is shown sealed-off by a gasket arrangement which utilizes a diagonally positioned continuous or annular resilient, O-ring gasket 16, and transversely positioned, continuous or annular, resilient O-ring gaskets 15 and 19. All of these gaskets have a substantially uniform pressure sealing engagement with the inner wall or periphery of the sleeve part 14. It will be noted that the gaskets 15 and 19 are carried within transverse annular groove portions 12b and 19b about the periphery of the stem part 12 (see FIG. 3), and the gasket 16 is carried within a diagonal or oblique, continuous groove portion 12c about the periphery of a central portion of the stem part 12 and across the side port therein. The gasket 16 primarily seals-off fluid flow between the flow chamber and the remaining space 18 between part 12 and sleeve part 14. This limits the fluid to flow through the port portion 14a of the sleeve when it is in alignment with the flow chamber and the side port of the bore 13 of the stem part 12. The gaskets 15 and 19 primarily serve to prevent fluid flow from the major housing chamber into and out of the upper open end and out of the lower open end of the sleeve or control part 14 and the spacing 18 defined between the two parts 12 and 14 (see FIG. 1).

Sealing-off of the spacing or joint between the lower, opposite or second open end portion of the housing 10 and a thickened lower or neck portion 14b of the sleeve part 14 is accomplished by a transversely positioned, annular resilient O-ring gasket 17. The gasket 17 has a substantially constant pressure-sealing, engagement about its extent with the second open end portion 10b of the housing 10.

In the embodiment of FIGS. 1 to 3, the weir part 11 may be removed by turning it upwardly outwardly out of the housing inlet portion 10a. On the other hand, the control or sleeve part 14 is introduced and removed through the lower, opposite or second open-end portion of the housing 10, and is operatively held in position for rotation therein through the agency of the hub portion of its manual operating wheel 14d and the annular flange 12d about a lower extending end portion of the stem 12. Thus, when it is desired to disassemble the parts, the stem part 12 may be unscrewed from the weir part 11 and removed downwardly outwardly from the opposite or lower end of the housing 10. This permits the control sleeve part 14 to also be removed downwardly outwardly from the housing.

With reference to the embodiment of FIGS. 4 and 5, the housing 20 is shown of circular configuration and as having an enlarged inlet end portion 20a that is fully open upwardly and provided with external threading. The enlarged chamber provided by the portion 20a converges into a smaller connecting passageway 20c which terminates in a slightly enlarged, centrally positioned, internally threaded portion 20b. The threaded portion 20b cooperates with an upper, male threaded end portion 21b of a core or stem part 21 to removably retain it in a stationary or fixed position within the housing 20.

The fixed position or stationary stem part 21, like the part 12 of the embodiment of FIG. 1, extends axially longitudinally along the housing of its associated valve unit and towards the opposite, second or lower end portion thereof. It will be noted that the stem part 21 is somewhat reverse in its flow passageway utilization. As shown in FIG. 5, bore 23 in the stem part 21 has an entry port (see arrow $b'$) at its upper end, a 90° positioned outlet side port (see arrow $c'$) and a closed-off bottom or opposite end that terminates within an inner chamber defined by a sleeve part 24 and wholly within the central or major chamber of the housing 20. The liquid enters downwardly through the inlet end portion 20a of the housing (see arrow $a'$) and is directed 90° or at right angles within the passageway of the bore 23 out through its side port (see arrow $c'$). On the other hand, in the embodiment of FIG. 1, the in-flow is through a side port in the stem part 12 (see arrow $c$) and centrally axially downwardly, outwardly through the lower outlet end portion 12e (see arrow $d$) thereof.

Operating control sleeve or cylinder part 24 is rotatably positioned in a spaced-apart relation about a lower, closed end of the stem part 21, within the major chamber of the housing 20. Both an open upper end of the sleeve part 24 and its side port 24c are sealed-off by the wiping engagement of an oblique, continuous, or annular, resilient, O-ring gasket 22 that is carried within an oblique peripheral groove or recess portion 21a that extends above and below the side port of the bore 23 within the stationary stem part 21. The joint or spacing between the lower, opposite or second open end of the housing part 20 and a lower end wall of the hollow cylindrical portion of the sleeve part 24 is sealed-off by a transversely positioned, continuous or annular O-ring resilient second gasket 25.

As shown in FIG. 4, the gasket 25 is carried within an annular groove or recess portion that is defined by a pair of spaced-apart, upper and lower, annular shoulder or flange portions 24a and 24b about a lower, outer peripheral wall portion of the sleeve part 24. The lower flange portion 24b is rounded in a complementary manner with respect to an inner edge of a mounting collar or ring 26. As shown, the collar 26 is internally threaded to cooperatively engage external threads 20d about the second or lower open end portion of the housing 20. For controlling the operation of the rotatable control sleeve part 24, it is shown provided with a downwardly outwardly extending operating portion 24d that projects through the lower open end of the housing 20. The operating portion 24d is shown provided with an angular end, circular centered hole to receive a screw or handle-mounting device. A radially inwardly extending flange of the collar 26 is adapted to closely lie adjacent the outer periphery of the shoulder portion 24b and cooperate with the lower or operating end portion 24d of the sleeve part to removably retain the operating sleeve part 24 in the position shown in FIG. 4.

To disassemble the valve unit of FIG. 4, the collar 26 is first removed, at which time the control sleeve part 24 can be lowered out of position within the housing 20. Then, if desired, the stem part 21 may be removed by rotating and withdrawing it from the lower end of housing 20. The operating portion 24d will preferably be of angular outer configuration. The external threading of the inlet portion 20a may be used for mounting or clamping on or adjacent to plumbing fixtures, sinks or other devices and provides as well a connecting means for fluid inlet. Conventional adaptors may be used for both the internally threaded portion 10a of the embodiment of FIG. 1 and the externally threaded portion 20a of the embodiment of FIG. 4.

It will appear that the valve units of both embodiments can be opened and closed by turning movements of the sleeve part 14 or 24, past gaskets 16 and 22 respectively. In each embodiment, a rotational, annular, diagonal gasket 16 or 22 defines a control chamber between fluid-flow ports or passageways. The gaskets 15, 19 and 25, like the gaskets 16 and 22, may be termed rotational in the sense of providing a seal between opposed parts that are rotatable with respect to each other. The construction is basically such that the operation of the valve is substantially uniform as to its force requirements, except when initiating a turning movement at which time a slight initial frictional force has to be overcome. It will also be apparent that the gaskets 16 and 22 are retained in a wiping type of compression sealing mounting of constant compression sealing force irrespective of whether the valve is opened, closed, or partially open. The oblique gasket positioning has been found to provide an improved sealing action for the port opening in the bore passageway of the stem part, particularly and importantly as applied in connection with the rotating sleeve immediately after or closely adjacent the point at which the liquid flow is changed 90° from its axial or longitudinal flow through the housing from the inlet end portion thereof. In the embodiment of FIG. 4, the liquid outlet is provided by an open side wall extension of the housing 20 that may be connected to a further distribution member as desired.

We claim:

1. In an improved valve that is suitable for draining-off liquid from a container, a hollow longitudinally extending housing, a longitudinally extending stationary stem part, and a rotatable operating sleeve part; said housing having an open inlet first end portion, having an opposite open second end portion, and having a central chamber connecting said end portions; said stem part being threadably secured at one end thereof within said inlet first end portion of said housing to extend in a spaced relation along said central chamber from the said first end portion of said housing, said stem part having an end port and a side port connected together by an angular shaped bore therein to define a liquid passageway therealong, said sleeve part having an open end facing said inlet first end portion and extending along the central chamber in a rotatable, concentrically spaced-apart, enclosing relation along and about said stem part and having an open port portion through its side wall for movement into and out of open alignment with the side port of said stem; said sleeve part having an operating portion extending outwardly through said second end portion of said housing and having a shoulder portion cooperating with said housing for positioning said sleeve part in a rotatable operating position within said housing and concentrically about said stem part, means cooperating with said shoulder portion and said housing for retaining said sleeve part in position within said housing, first rotational annular sealing gasket means operatively positioned diagonally about the outside of said stem part to define a control chamber between said stem and sleeve parts, said first gasket means sealing-off spacing between the outer periphery of said stem part and the inner periphery of said sleeve part in a diagonal cross-extending relation with respect to said side port, and second rotational annular sealing gasket means cooperatively positioned between said sleeve part and said second end portion of said housing part for sealing-off a joint between the outer periphery of said sleeve part and the inner periphery of said housing adjacent said second end portion thereof.

2. In an improved valve as defined in claim 1, said sleeve part having open ends, and third rotational annular gasket sealing gasket means positioned about said stem in sealing engagement with the inner side of said sleeve part for sealing-off the open ends of said sleeve part and supplementing the sealing-off action of said diagonally positioned first sealing gasket means.

3. In an improved valve as defined in claim 2, a weir part removably secured within said housing in line with and adjacent said inlet end portion of said housing, said weir part having open portions therethrough for passing liquid from said inlet end portion into the central chamber of said housing.

4. In an improved valve as defined in claim 3, said inlet end portion and said weir part having cooperating outer threads for removably securing said weir part within said housing, and said weir and stem parts having cooperating inner threads for securing said stem part within said weir part.

5. In an improved valve as defined in claim 4, said open portions through said weir part being circumferentially spaced-apart slots that are positioned between said inner and outer threads of said weir part.

6. In an improved valve as defined in claim 1 wherein open end joints are defined between said stem and said sleeve parts at opposite end portions of said stem part; and third sealing gasket means is provided that comprises, a pair of gaskets of which one is operatively positioned between said stem and sleeve parts to seal-off one open end joint, and the other of which is operatively positioned between said parts to seal-off the other open-end joint.

7. In an improved valve as defined in claim 1, said stem part having an inlet portion at said side port and having an outlet portion at said end port thereof, said stem part having a flange constituting said cooperating means for operatively retaining said sleeve part in a rotatable position within said housing and having a connector at its said outlet portion through which the liquid is to be discharged.

8. In an improved valve as defined in claim 1, said stem part having an inlet portion at said end port and an outlet portion at said side port thereof, and said stem part terminating in a closed end opposite said inlet portion thereof that is positioned within the central chamber of said housing and fully within an inner chamber defined by said sleeve part.

9. In an improved valve as defined in claim 1, said sleeve part having a hollow cylindrical body that is open upwardly to said inlet end portion of said housing and is closed downwardly thereof to define a secondary chamber within the central chamber of said housing.

10. In an improved valve as defined in claim 1, said stem part having a diagonal groove portion extending continuously about the outer periphery of its side wall for carrying said diagonally positioned first sealing gasket means therein, said sleeve part having a pair of outwardly extending spaced-apart shoulder portions adjacent a lower end thereof that define a groove portion for carrying said second sealing gasket means therein, one of said shoulder portions being the portion cooperating with said housing, and said cooperating means being a mounting collar removably secured on said second end portion of said housing and having a portion projecting transversely inwardly to cooperate with said one shoulder portion.

11. In an improved valve as defined in claim 1, said cooperating means being a collar threadably mounted on said housing.

12. In an improved valve that is suitable for draining-off liquid from a container, a hollow longitudinally extending housing, a longitudinally extending stationary stem part, and a rotatable operating sleeve part; said housing having an open inlet first end portion, having an opposite open second end portion, and having a central chamber connecting said end portions; said stem part having means at one end thereof securing it to extend in a spaced relation along said central chamber from the said first end portion of said housing, said stem part having an end port and a side port connected together by an angular shaped bore therein to define a liquid passageway therealong, said sleeve part having an open end facing said inlet first end portion and extending along the central chamber in a rotatable, spaced-apart, enclosing relation along and about said stem part and having an open port portion through its side wall for movement into and out of open alignment with the side port of said stem; said sleeve part eatending outwardly through said second end portion of said housing and having operating means for rotating said sleeve part within said housing, first rotational annular sealing gasket means operatively positioned diagonally about the outside of said stem part to define a control chamber between said stem and sleeve parts, said first gasket means sealing-off spacing between the outer periphery of said stem part and the inner periphery of said sleeve part in a diagonal cross-extending relation with respect to said side port, second rotational annular sealing gasket means operatively positioned between said sleeve part and said second end portion of said housing part for sealing-off a joint between the outer periphery of said sleeve part and the inner periphery of said housing adjacent said second end portion thereof, said stem part having a portion extending longitudinally outwardly within said sleeve part from said second end portion of said housing and having a ring flange projecting radially therefrom outside of said housing and cooperating with said sleeve part for operatively holding said sleeve part in position within the central chamber of said housing.

13. In an improved valve as defined in claim 12, said end port of said stem being open from said outwardly extending portion thereof to define a liquid outlet portion, and connector means on said outlet portion of said stem.

14. In an improved valve as defined in claim 12, said operating means being a turn wheel carried by said sleeve part and cooperating with said ring flange.

* * * * *